J. H. ATHONS.
SPRING.
APPLICATION FILED FEB. 26, 1912.
1,107,567.
Patented Aug. 18, 1914.
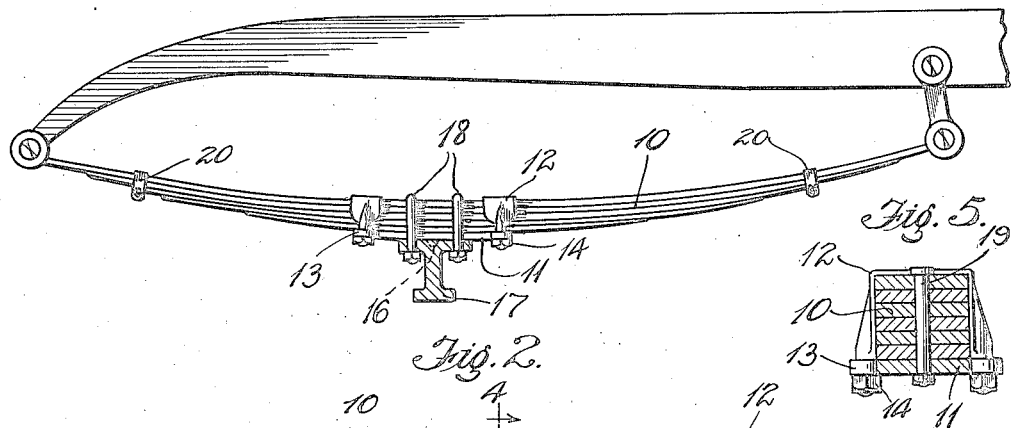
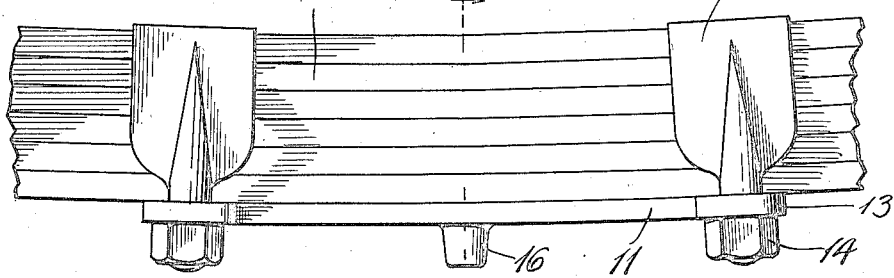
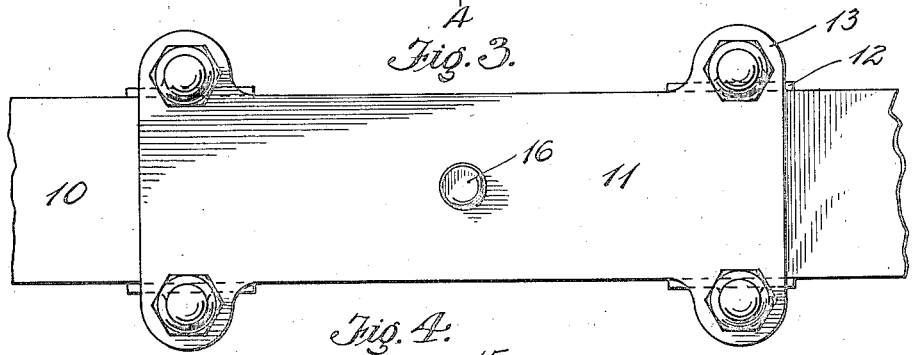
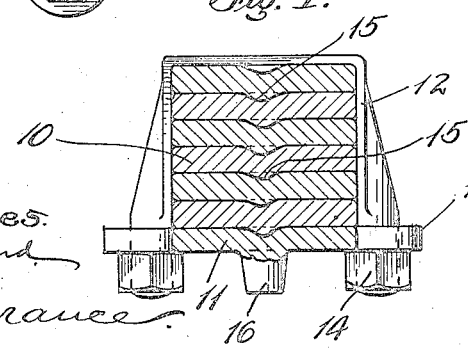
Witnesses.
E. R. Picard
C. Severance
Inventor
Joseph H. Athons
by
Howard Strause
Attys.

UNITED STATES PATENT OFFICE.

JOSEPH H. ATHONS, OF LOS ANGELES, CALIFORNIA, ASSIGNOR TO CAMBRIA SPRING COMPANY, OF LOS ANGELES, CALIFORNIA, A CORPORATION OF CALIFORNIA.

SPRING.

1,107,567.            Specification of Letters Patent.     Patented Aug. 18, 1914.

Application filed February 26, 1912. Serial No. 679,819.

*To all whom it may concern:*

Be it known that I, JOSEPH H. ATHONS, a citizen of the United States, residing at Los Angeles, in the county of Los Angeles and State of California, have invented new and useful Improvements in Springs, of which the following is a specification.

This invention relates to improvements in springs and has particular relation to leaf springs which are adaptable for use upon various kinds of vehicles and especially upon automobiles.

It is an object of the invention to provide a clamping and holding means for the central portion of the leaf spring which will tend to spread the crystallizing area of the spring to a considerable extent.

It is also an object of the invention to provide a binding and clamping means for the leaves of a leaf spring which will hold the said leaves in proper relation to each other at all times and which will prevent the crystallizing of the metal of the springs at the point where the spring must support the weight placed upon it.

In the accompanying drawing forming a part of this specification, Figure 1 is a side elevation of a spring constructed in accordance with this invention and applied to the framing of an automobile. Fig. 2 is an enlarged side elevation of the central portion of said spring. Fig. 3 is a bottom plan view of the same. Fig. 4 is a transverse sectional view taken upon the line 4—4 of Fig. 2. Fig. 5 is a similar transverse sectional view but showing a bolt passed through the leaves of the spring for positioning them with respect to each other.

The details and features of the invention will now be more particularly described, reference being had to the said drawing in which 10 indicates the leaf spring and 11 a plate applied thereto while 12 indicates clips for securing the said plate 11 upon the spring. The leaves of the spring are constructed in any usual or ordinary manner, one leaf being made the full length of the spring while the others are successively shortened toward the center of the spring. Heretofore it has been customary to secure such springs centrally to an axle or a portion of a vehicle frame by means of clips or bolts which engage the spring near the central part thereof.

As is well known the vibrations of the springs tend to crystallize them at or near the point where they are gripped together and thus the springs frequently break at the point where they rest. By the present invention the leaves of the spring are tightly clamped and held together at points at a distance from and upon either side of the supporting point, so that the area which is liable to crystallize from the vibrations of the spring, is thus spread to a considerable degree. The crystallization of the metal is thus not centralized at the point of greatest danger and where the springs usually break. In carrying out this feature of the invention a strong plate 11 of suitable length is applied to one side of the spring, preferably to the outer bowed side thereof as shown in the drawing, the ends of said plate being provided with projecting portions 13 through which the ends of the securing clips 12 may be inserted and secured by means of suitable nuts 14. The plate and clips 12 are designed to be a part of the spring at all times and in addition to preventing the central crystallization of the leaves thereof, also act as a binder and holding means for the leaves in shipment and at all times before and after the spring is applied upon a vehicle.

The leaves may each be provided with central bosses 15 adapted to be formed by indenting the metal of the leaves centrally, one boss fitting into the indentation of the next as clearly shown in Fig. 4. In this manner all the leaves are held from slipping with respect to each other. The plate 11 is usually also formed with a central lug or detent 16, which is adapted to engage a recess formed in the bar 17 of the vehicle frame, to which the said spring is secured.

The usual securing clips 18 are employed for holding a spring to the frame, just as in the case of other springs which are not provided with the said strengthening and clamping plate 11. If preferred the leaves of the spring and the plate 11 may be perforated and a bolt 19 passed through all of them as shown in Fig. 5 for holding the parts together.

In using automobile springs of this character it has been common to nick or bend the edges of the shorter leaves near their ends, in such a way as to prevent them moving laterally upon the longer leaves. By the use of the elongated plate 11 and the binding clips 12 set well outwardly on opposite sides of the center of the spring, it is not necessary to use such nicks or holding flanges upon any of the leaves of the spring. However, it is sometimes desirable to place clips 20 on the spring near the outer ends thereof to hold the ends of the longer leaves together and in place.

What I claim is:

In a vehicle spring construction, the combination of a flanged axle having a seat provided with apertures and a socket, an elliptical leaf spring having positioning indentations, an elongated saddle to receive the outer bowed member of said springs and the positioning indentation thereon, said saddle operating to extend the crystallizing area of the spring leaves, a lock on the underside of said saddle adapted to extend into the socket on the axle to position the spring, apertured extensions on each side of said saddle adjacent its ends and extending beyond the sides of the springs, threaded clips adapted to embrace said springs and extend through the apertures in said saddle, nuts on said clips to permanently bind the saddle and springs together, and separate clips encompassing the spring leaves and engaged with the axle through the apertures therein, said last named clips extending on opposite sides of the saddle out of engagement therewith.

In witness that I claim the foregoing I have hereunto subscribed my name this 19th day of February, 1912.

JOSEPH H. ATHONS.

Witnesses:
 E. STADLMAN,
 EARLE R. POLLARD.